(12) United States Patent
Voisin (10) Patent No.: US 11,971,516 B2
(45) Date of Patent: Apr. 30, 2024

(54) METHOD FOR DETECTING A FLUID AND ASSOCIATED SYSTEM (71) Applicant: CENTRE NATIONAL DE LA RECHERCHE SCIENTIFIQUE, Paris (FR)

(72) Inventor: Christophe Voisin, Grenoble (FR)

(73) Assignee: CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 599 days.

(21) Appl. No.: 17/269,717

(22) PCT Filed: Aug. 21, 2019

(86) PCT No.: PCT/EP2019/072343
§ 371 (c)(1),
(2) Date: Feb. 19, 2021

(87) PCT Pub. No.: WO2020/038985
PCT Pub. Date: Feb. 27, 2020

(65) Prior Publication Data
US 2021/0318459 A1    Oct. 14, 2021

(30) Foreign Application Priority Data
Aug. 21, 2018 (FR) ..................... 1857560

(51) Int. Cl.
*G01V 1/36* (2006.01)
*G01V 1/30* (2006.01)

(52) U.S. Cl.
CPC ............ *G01V 1/364* (2013.01); *G01V 1/30* (2013.01); *G01V 2210/60* (2013.01); *G01V 2210/61* (2013.01)

(58) Field of Classification Search
CPC ...... G01V 1/364; G01V 1/30; G01V 2210/60; G01V 2210/61; G01V 2210/612; G01V 1/366; G01V 1/28; G01V 1/306
See application file for complete search history.

(56) References Cited

U.S. PATENT DOCUMENTS

| 5,563,949 A | 10/1996 | Bahorich et al. |
| 2016/0025873 A1* | 1/2016 | Hollis ............... G01V 1/003 367/37 |

(Continued)

FOREIGN PATENT DOCUMENTS

| EP | 3841407 A1 * | 6/2021 | ............... G01V 1/28 |
| FR | 3085212 B1 * | 8/2020 | ............... G01V 1/28 |

(Continued)

OTHER PUBLICATIONS

International Search Report for PCT/EP2019/072343, dated Sep. 13, 2019, 5 pages.

(Continued)

*Primary Examiner* — Daniel Pihulic
(74) *Attorney, Agent, or Firm* — NIXON & VANDERHYE (57) ABSTRACT

Disclosed is a method for detecting a fluid, including at least one step of: measuring by at least one sensor of a wave propagating in an environment of the wave, in order to obtain at least one measured signal, the wave being particularly a mechanical wave; splitting the measured signal over a plurality of split time intervals with a predefined duration in order to obtain samples of the measured signal; computing the temporal coherence of the samples; and determination of the presence of the fluid using the computed temporal coherence.

20 Claims, 5 Drawing Sheets

(56) References Cited

U.S. PATENT DOCUMENTS

| | | | | |
|---|---|---|---|---|
| 2016/0025874 A1* | 1/2016 | Hollis | | G01V 1/288 |
| | | | | 367/37 |
| 2017/0139064 A1* | 5/2017 | Song | | G01V 1/181 |
| 2021/0318459 A1* | 10/2021 | Voisin | | G01V 1/28 |

FOREIGN PATENT DOCUMENTS

| | | |
|---|---|---|
| WO | 00/73820 A1 | 12/2000 |
| WO | 2016063125 | 4/2016 |
| WO | 2017/184340 A1 | 10/2017 |
| WO | WO-2020038985 A1 * | 2/2020 ............... G01V 1/28 |

OTHER PUBLICATIONS

Written Opinion of the ISA for PCT/EP2019/072343, dated Sep. 13, 2019, 7 pages.

Voisin et al., "Groundwater Monitoring with Passive Seismic Interferometry", Journal of Water Resource and Protection, vol. 9, No. 12, Nov. 29, 2017, pp. 1414-1427.

Voisin et al., "Seismic noise monitoring of the water table in a deep-seated, slow-moving landslide", Interpretation, vol. 4, No. 3, Aug. 1, 2016, 10 pages.

* cited by examiner

METHOD FOR DETECTING A FLUID AND ASSOCIATED SYSTEM

CROSS-REFERENCE TO RELATED APPLICATIONS

This application is the U.S. national phase of International Application No. PCT/EP2019/072343 filed 21 Aug. 2019, which designated the U.S. and claims priority to FR Patent Application No. 1857560 filed 21 Aug. 2018, the entire contents of each of which are hereby incorporated by reference.

FIELD

The present invention relates to a method for detecting a fluid. The present invention also relates to a system for the detection of a fluid.

The invention relates to the field of fluid detection in a specific location and more particularly to the field of geophysical prospecting.

BACKGROUND

Seismic prospecting methods are known which make it possible to gain knowledge of the geological structures at depth, of a place, through the analysis of the echoes of mechanical waves.

For example, in such methods, mechanical waves are measured by a large number of sensors arranged at different positions. The measurements made by the sensors are processed to obtain information about a change in the velocity of mechanical waves in the ground. By detecting such a change in velocity, fluids located at depth are thus detected.

However, such methods are not entirely satisfactory. In particular, these methods are complicated to implement because of the large number of sensors and the complex signal transmission and processing facilities.

SUMMARY

There is a need for a simpler detection method that guarantees at least as accurate a fluid detection.

For this purpose, the present description relates to a detection method comprising at least one step of measurement by at least one sensor of a wave propagating in an environment of the wave, to obtain at least one measured signal, the wave being in particular a mechanical wave, a step of splitting the measured signal over a plurality of split time intervals of predefined duration to obtain samples of the measured signal, a step of calculating the temporal coherence of the samples, and a step of determining the presence of the fluid using the computed temporal coherence.

According to particular embodiments, the detection method comprises one or more of the following features, taken alone or in all technically possible combinations:

- during the splitting step, each split time interval has the same duration, preferably between 5 minutes and 2 hours.
- the detection method also includes a step of filtering and equalizing the measured signal in a predefined frequency range, preferably between 30 seconds and 2 Hertz.
- the detection method, in addition, includes a reference computation step, in which a reference is computed, and the temporal coherence computation step comprises a comparison of a plurality of correlations with the reference, each correlation being related to a split time interval.
- the reference is the average of correlations of samples of the measured signal over a reference time period.
- the reference time period is strictly greater than the maximum of the split intervals, preferably between 20 days and 40 days.
- the detection method, in addition, comprises a step of normalizing each sample of the measured signal by the energy of the measured signal.
- during the measurement step, the measured signal is measured by a single sensor.
- during the measurement step, the at least one measured signal comprises a first signal measured by a first sensor and a second signal measured by a second sensor, the first sensor being distinct from the second.

This description also refers to a detection system comprising at least one sensor configured to measure a wave propagating in an environment of the wave to obtain at least one measurement signal, the wave being notably a mechanical wave, and a controller configured to split the measured signal over a plurality of split time intervals of predefined duration to obtain samples of the measured signal, calculate the temporal coherence of the samples, and determine the presence of the fluid using the computed temporal coherence.

BRIEF DESCRIPTION OF THE DRAWINGS

Other features and advantages of the invention will appear when reading the following description of ways of implementing the invention, given as examples only and with reference to the drawings which are.

DETAILED DESCRIPTION

Figure 1:
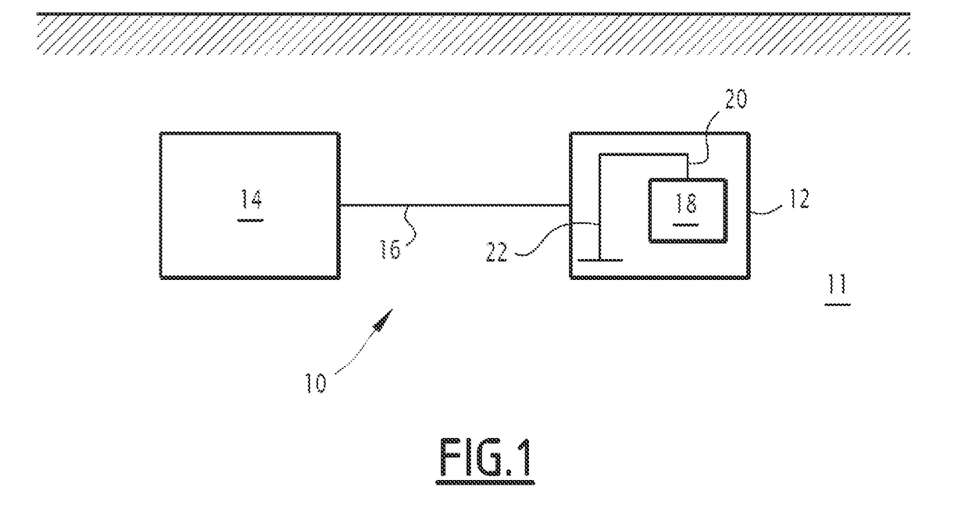
FIG. 1, a schematic representation of a fluid detection system according to a first embodiment.
Figure 2:
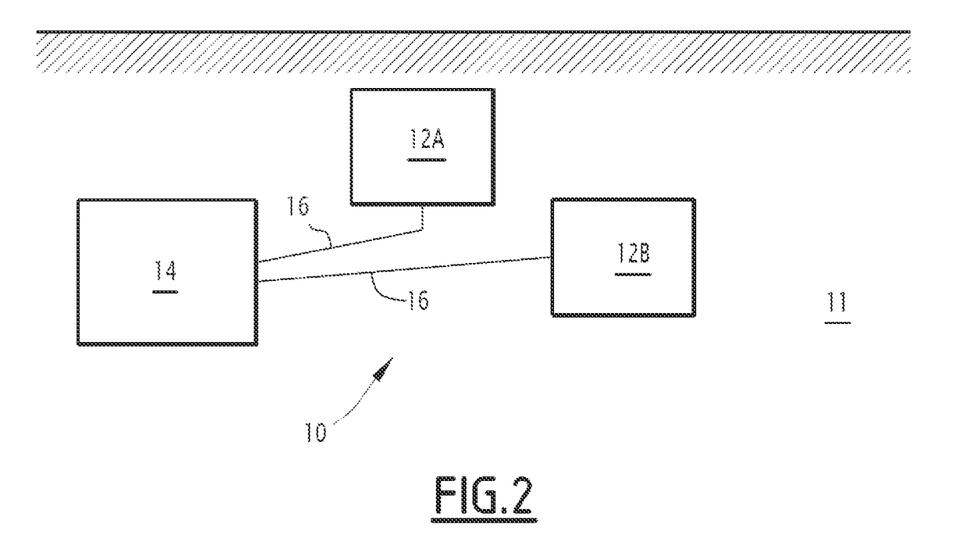
FIG. 2, a schematic representation of a fluid detection system according to a second embodiment.

A detection system 10 to detect a fluid in its environment 11 is shown in FIGS. 1 and 2. The environment 11 is also called medium.

In the following, it is assumed that the environment 11 contains a fluid buried in the ground. The detection system 10 is designed to detect this fluid. In other words, the detection system 10 is suitable for implementing a method for detecting a fluid.

The fluid is, particularly, a liquid or a gas. The fluid is, for example, oil, water, natural gas, $CO_2$, $H_2$ or $CH_4$.

The environment 11 is traversed by mechanical waves the origin of which is indeterminate. All of these waves together constitute ambient seismic noise. These waves propagate, particularly, in the part of the environment 11 which contains the fluid to be detected. These waves are recorded by the detection system 10.

According to a first example, the detection system 10 includes a sensor 12, a controller 14 and a link 16.

The sensor 12 is able to measure the mechanical wave generated by the fluid. By the term "measure", it is understood that sensor 12 is able to obtain the amplitude and frequency of the mechanical wave.

In one embodiment, sensor 12 is a seismic sensor, also called seismometer. The seismic sensor is particularly suitable for measuring the movement of a geological mass.

The sensor 12 includes, as visible on FIG. 1, a heavy mass 18 connected by at least a spring 20 to a frame 22. When the earth moves, frame 22 also moves. The mass 18 moves very little in relation to a geographical marker, because of the inertia of the mass 18. Sensor 12 is configured to measure the relative movement between the mass 18 and the frame 22.

The sensor 12 is, for example, positioned below the earth's surface.

According to the example in FIG. 1, the detection system 10 consists of a single sensor 12.

The sensor 12 is connected to the controller 14 via the link 16, which ensures data transmission between the sensor 12 and the controller 14.

The controller 14 is capable of performing the computations or signal processing of the fluid detection method that the detection system 10 is capable of performing. The controller 14 is a computer.

More generally, the controller 14 is an electronic computer capable of manipulating and/or transforming data shown as electronic or physical quantities in the controller 14 registers and/or memories into other similar data corresponding to physical data in the memories, registers or other types of display, transmission or storage devices.

The controller 14 includes a processor comprising a data processing unit and memories. The controller 14 also includes a media reader configured to read a computer program stored on a readable data storage medium, not shown. The controller 14, in addition, includes a computer software product that includes program instructions.

The controller 14 is positioned remotely from the sensor 12, for example at a distance of strictly greater than 10 meters. The distance between two objects is defined as the minimum distance between two points belonging respectively to one of the objects.

Alternatively, the controller 14 is positioned close to the sensor 12. By "close" is meant a distance of less than one meter. The fact that the controller 14 is positioned close to the sensor 12 makes it possible to implement a short link 16 and thus makes the detection system 10 simple.

Figure 3:
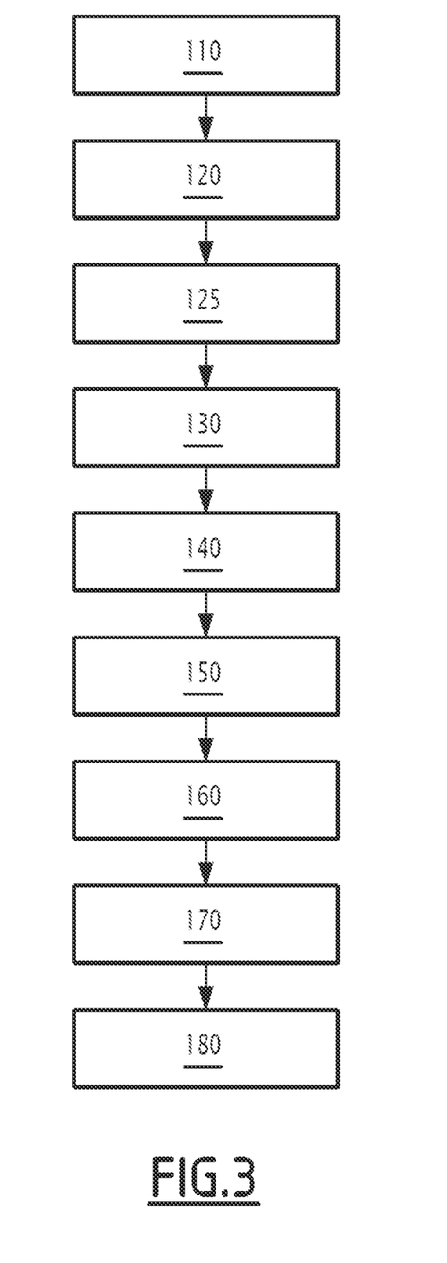
FIG. 3, a flowchart of an example of implementation of an example of the detection method.

The operation of the detection system 10 will now be described according to a first embodiment, with reference to FIG. 3 showing a flowchart of an example of implementation of a fluid detection method.

The detection method makes it possible to detect the presence of a fluid in the environment 11.

The detection method includes a measurement step 110, a filtering step 120, an equalization step 125, a splitting step 130, an energy normalization step 140, a correlation computation step 150, a reference definition step 160, a coherence computation step 170 and a determination step 180 of the presence of a fluid.

During the measurement step 110, the sensor 12 measures a wave having traversed the fluid in the environment 11.

The wave varies the position of the frame 22 of the sensor 12. The mass 18 moves in relation to the geographical reference mark, i.e. by an amplitude of displacement, of at least an order of magnitude less than the amplitude of the displacement of frame 22 in relation to the geographical reference mark.

The sensor 12 measures the relative displacement between the mass 18 and the frame 22, corresponding to a measured signal S over time. As the measured signal is variable over time, it is also called the measured signal S(t).

Figure 4:
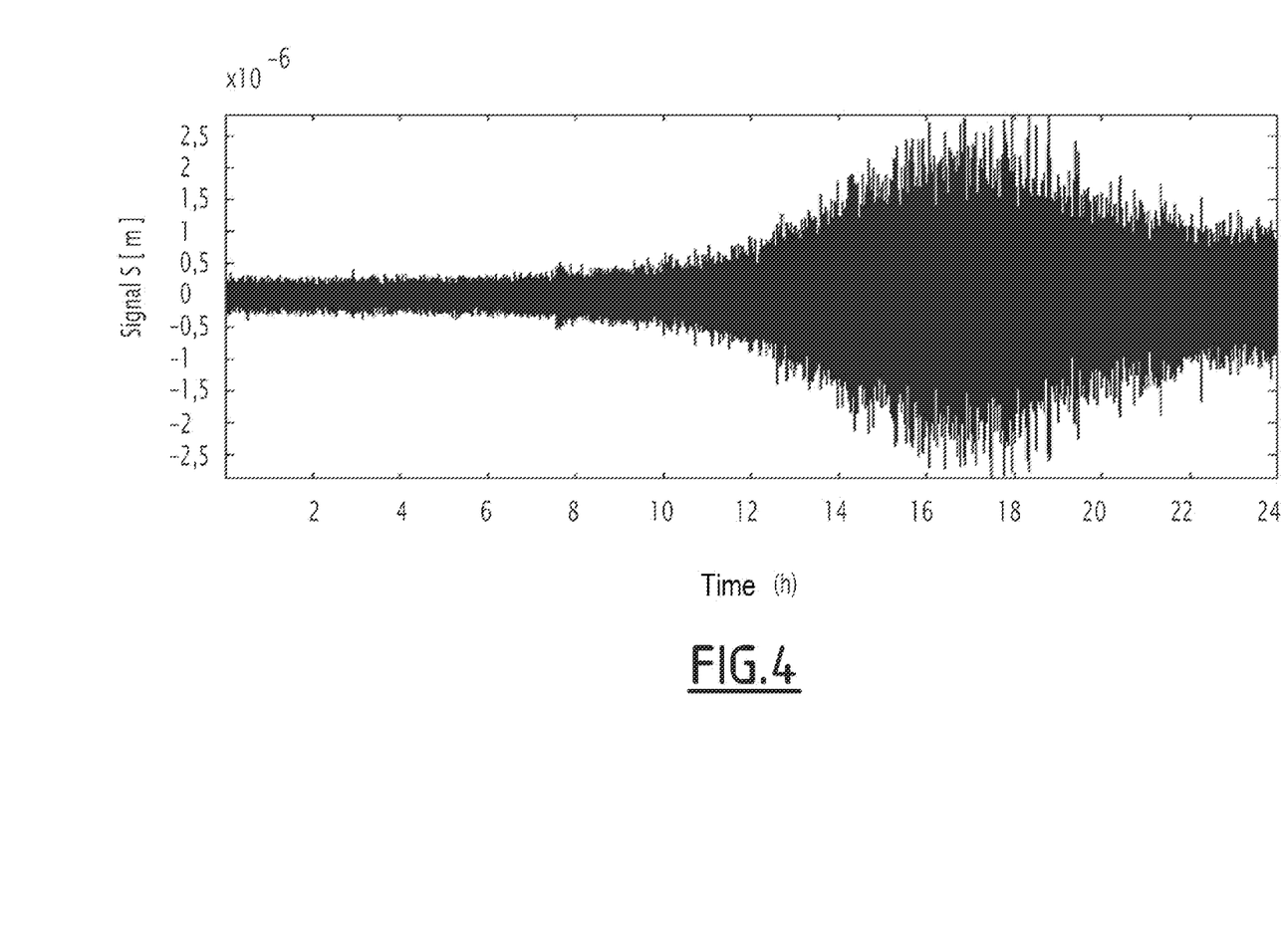
FIG. 4, a graph giving an evolution of a signal measured by a sensor as a function of time.

An example of the time evolution of the measured signal S is shown in FIG. 4. The time is shown on the abscissa and the amplitude of the measured signal S on the ordinate. The maximum amplitude of the measured signal S corresponds to an amplitude of movement of ten micrometers.

In an example, if no data is measured at a given moment, the controller 14 adds a data of zero value, in order to respect the continuity of time in the measured signal S.

In FIG. 4, the measured signal S corresponds, for example, to a displacement according to a vertical direction from the ground. According to other examples, the displacement of the ground according to one or more horizontal directions is measured.

The temporal evolution of the measured signal S is observed over a relatively long period of time, in particular between 14 h and 24 h.

The sensor 12 transmits the measured signal to the controller 14 for processing of the measured signal S.

In the filter step 120, the measured signal S is filtered.

The measured signal S is transformed by the controller 14 from the time domain to the spectral domain to obtain a $S_{trans}$ frequency signal. The transformation is, for example, a Fourier transform, defined by the general formula:

$$S_{trans}(\xi) = \int_{t1}^{t2} S(t) e^{-2\pi i \xi} dt$$

with:
 $\xi$ a frequency variable, and
 t a time variable.

In particular, a predefined time period of the measured signal S between a first instant t1 and a second instant t2 is studied. The time period is also called the processing period.

For example, the transformation is implemented by a Fast Fourier Transform (FFT).

The controller 14 filters the $S_{trans}$ frequency signal through a bandpass filter. The bandwidth of the filter is chosen so that frequencies above and below the extreme frequencies of the bandwidth are attenuated, in order to obtain only frequencies that are particularly relevant for the detection of a fluid at a given depth, for example, a depth less than or equal to 30 km.

"Particularly relevant for the detection of a specific fluid" means a band of frequencies relative to a given depth.

The bandwidth is, for example, between 1/30 Hz (30 seconds) and 2 Hz, especially for applications relating to the earth's crust. Such a choice of bandwidth allows the attenuation of spurious frequencies in the $S_{trans}$ frequency signal. Interference frequencies are, for example, frequencies produced by the operation of the sensor 12 or other technical facilities that generate vibrations.

In addition, the choice of bandwidth can be used to restrict the range of depths of investigation.

In the equalization step 125, the controller 14 performs a spectral equalization of the $S_{trans}$ transferred signal.

The equalization step 125 is only intended to correct faults or anomalies in the ambient seismic noise. These ambient seismic noise faults or anomalies include sources that may extinguish or attenuate seismic waves at a particular frequency or intermittent sources. In other words, the equalization step 125 thus makes it possible to obtain modifications in the seismic noise caused solely by a change in the environment 11 and/or the fluid.

The spectral equalization is performed in the spectral domain to put the amplitude of the spectrum of the measured signal overall at the same level for all frequencies, while respecting local variations and especially without modifying the phase of the measured signal.

One possible way of performing spectral equalization is called spectral whitening. Spectral equalization is a processing of the $S_{trans}$ frequency signal to obtain a $S_{eg}$ equalized signal.

The measured signal S(t) on the processing window is shown in the spectral domain by $\overline{S}(f)$, where $\overline{S}(f)$ is, for example, the Fourier transform of the measured signal S(t). A spectral support of $\overline{S}(f)$ is $[f_{min}\ f_{max}]$; $f_{min}$, for example, is equal to 0.03 Hz and $f_{max}$ is, for example, equal to 2 Hz. An apodization window H is defined as follows:

$$\prod = \left(\sin\left(\frac{\pi}{2} \times \frac{f - f_{min}}{f_1 - f_{min}}\right)\right)^2 \forall f \in [f_{min}\ f_1]$$

$$\prod = 1 \quad \forall f \in ]f_1\ f_2[$$

$$\prod = \left(\cos\left(\frac{\pi}{2} \times \frac{f - f_2}{f_{max} - f_2}\right)\right)^2 \forall f \in [f_2\ f_{max}]$$

where $f_{min} < f_1 < f_2 < f_{max}$

The following computation is then performed to obtain the equalized signal $S_{eg}$:

$$S_{eg} = \frac{\overline{S}(f)}{|\overline{S}(f)|} \times \prod$$

Then, the $S_{eg}$ equalized signal is transformed back into the time domain. For example, an inverse Fourier transform is applied to the $S_{eg}$ equalized signal to obtain a processed signal $S_t$ in the time domain. The processed signal $S_t$ is the measured signal S, filtered and equalized.

The inverse Fourier transform corresponds to the following equations:

$$S_t(t) = \int_{\xi_1}^{\xi_2} S_{trans}(\xi) e^{+2\pi\xi t} d\xi$$

with:

$\xi_1$ a first frequency value, and
$\xi_2$ a second frequency value.

Figure 5:
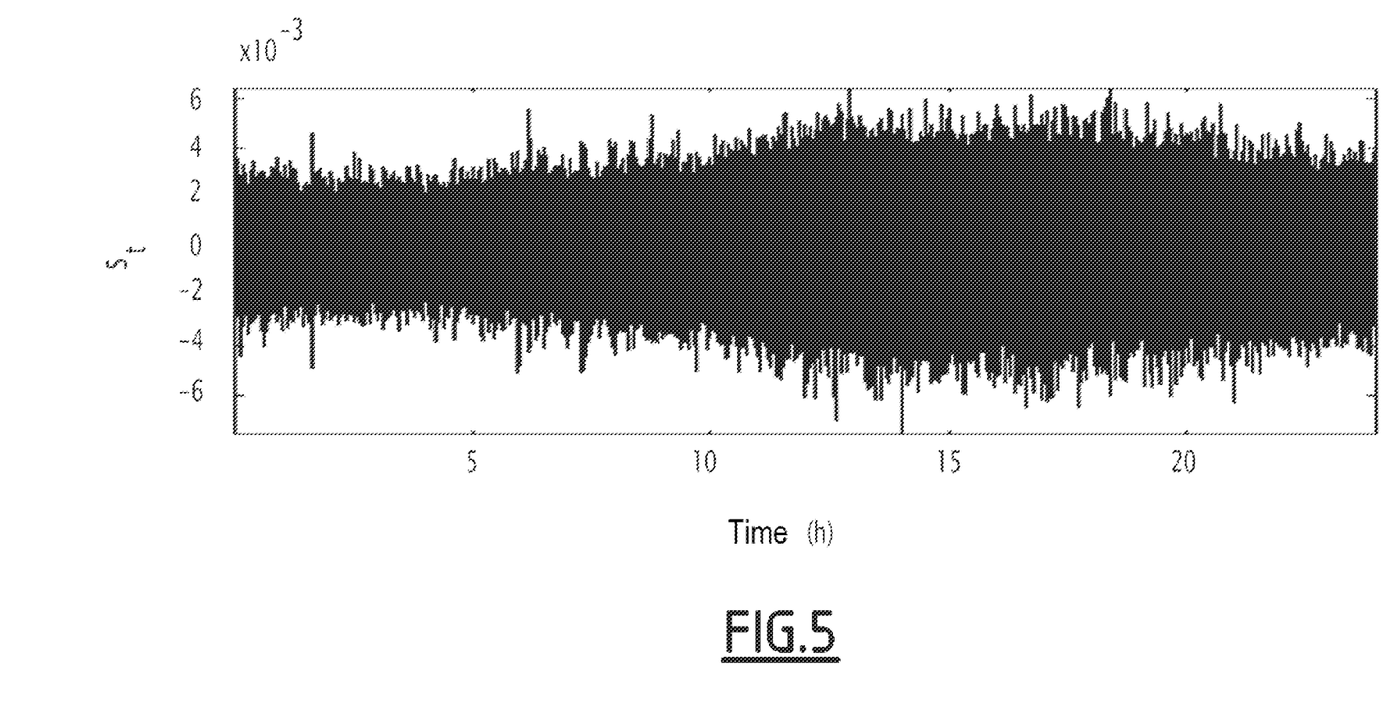
FIG. 5, a graph giving the evolution of the signal of FIG. 4 after equalization, and FIG. 6, a graph showing the time evolution of the correlation of the measured signal in FIG. 4.

An example of the processed signal $S_t$, is shown in FIG. 5. It is shown in this FIG. 5 with the abscissa time and the ordinate amplitude of the processed signal $S_t$. The amplitude of the processed signal $S_t$ is a function of the ground motion. For example, the amplitude is proportional to the ground motion.

In the splitting step 130, the processed signal $S_t$ in the time domain is split into a plurality of samples of the processed signal $S_t$. Each signal corresponds to a split time interval.

Each split time interval has a predefined duration.

In particular, the duration of each split time interval is strictly less than the processing period.

The duration of the split time interval is chosen in particular to optimize the use of natural seismic noise (longer window required) and/or the use of artificial sources (window corresponding then to the duration of each artificial source modulated by the propagation between the source and the sensor(s)).

In other words, the duration of the split time interval is chosen so as to obtain a compromise between the use of natural seismic noise and the use of artificial sources.

The duration of the split time interval is, for example, between 5 minutes and 2 hours, for example, equal to 60 minutes.

In the energy normalization step 140 of the processed signal $S_t$, each sample of the processed signal $S_t$ is normalized by the energy of the processed signal $S_t$.

"Energy normalized" means that each sample of the processed signal $S_t$, presents at the end of the step, an equal energy relative to each other. The normalization N of the signal $S_t$ is performed as follows:

$$N = \frac{S_t}{\sqrt{\left|\int S_t\right|^2}}$$

In the computation step 150, the controller 14 calculates a correlation with itself, called the autocorrelation of each split window of the processed signal $S_t$. By noting such an autocorrelation as AC, the autocorrelation AC is defined as follows:

$$AC(p, s) = \frac{E[(S_t(p) - \mu_p)(S_t(s) - \mu_s)]}{\sigma_p \sigma_s}$$

with:

E(X): the mathematical expectation of X (defined below);
p and s are two different instants;
$\mu_p$ the mathematical expectation of $S_t(p)$;
$\mu_s$ the mathematical expectation of $S_t(s)$;
$\sigma_p$ the standard deviation (see below) of $S_t(p)$, and
$\sigma_s$ the standard deviation of $S_t(s)$.
The mathematical expectation is defined as follows:

$$E(X) = \sum_{i=1}^{n} x_i p_i$$

with:

i an integer varying between 1, 2, ... n, n being the total number of samples taken into account for the computation of the mathematical expectation;
$x_i$ a value of a signal X, and
$p_i$ the probability of the $x_i$ value of signal X.

With the signs introduced previously, the standard deviation a is defined as follows:

$$\sigma = \sqrt{\sum_{i=1}^{n} p_i(x_i - E(X))^2}$$

The autocorrelation of a window of ambient seismic noise allows the coherent wave field to emerge which is measured by the sensor 12.

In particular, the correlation of the ambient seismic noise field allows to reconstruct a coherent field containing surface waves. The property of these waves is dispersion. They sample different depths of the environment 11 according to their frequency for example. For example, the lower the frequency, the deeper the environment 11 is probed.

Figure 6:
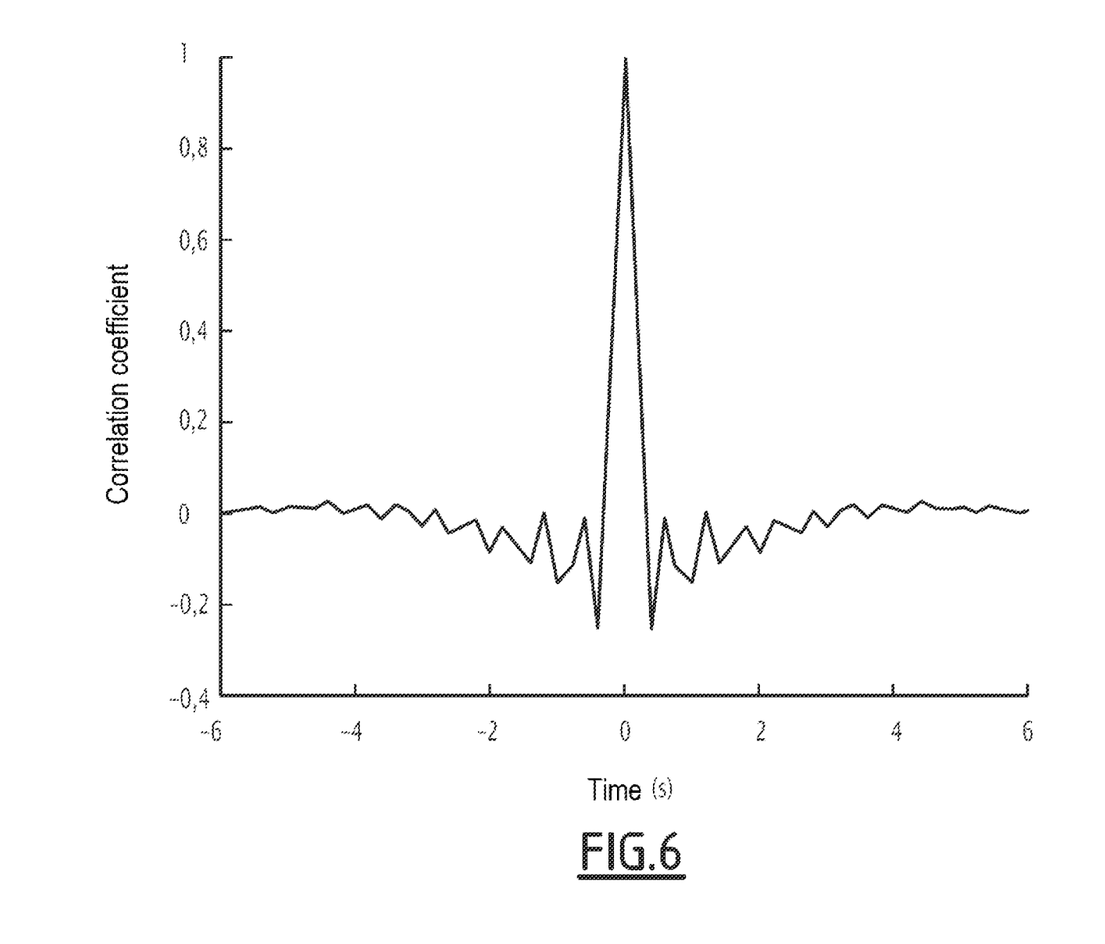

In FIG. 6, an example of autocorrelation of the signal $S_t$ is shown. It is shown on the abscissa of the time t and on the ordinate of a correlation coefficient. In the example, only the instants within ±6 seconds of the instant of time zero are shown.

A coefficient with a value of "1" or "−1" means that the measured signal is strongly correlated with itself perfectly, and a value of "0" means that the measured signal is not linearly correlated.

For example, at the instant of time zero, the autocorrelation of the measured signal is maximal (and shows the energy of the signal, normalized in this case), and the autocorrelation presents symmetrical oscillations at the zero point. Preferably, the controller 14 determines the autocorrelation AC of each window of the processed signal $S_t$ to obtain a succession of autocorrelations AC.

From the succession of autocorrelations AC, the controller 14 determines a correlogram, for example for one day and/or for a period longer than one day.

The correlogram is a diagram displaying all the autocorrelations AC computed in computation step 150. The correlogram is thus a display of the values of the autocorrelations AC over time.

The autocorrelation AC shows, for example, a larger value or a smaller value after, for example, one day. For example, when such a change in autocorrelations over time occurs, a movement of a fluid is detected. In particular, the plurality of autocorrelations is especially representative of the movement of a fluid.

During the reference defining step 160, the controller 14 calculates a reference $S_{ref}$. The reference $S_{ref}$ is the average of the set i of the autocorrelations AC of the samples of the processed signal $S_t$ considered over a reference period of time.

The reference $S_{ref}$ is, for example, computed as follows:

$$S_{ref} = \frac{1}{n}\sum_{i=1}^{n} AC_i$$

In this equation, the autocorrelations $AC_i$ are the autocorrelations computed from the measured signals S during the reference time period. In other words, the quantity $i=1, \ldots n$ corresponds to the set of signals measured during the reference time period.

The reference time period is, for example, strictly greater than each split time interval.

According to a particular example, the reference time period is predefined. The reference time period is, for example, between 20 days and 40 days, and even more specifically equal to 30 days. In particular for the application temporal monitoring of fluids in the environment 11 at the crustal scale, the reference temporal period is, for example, between 20 days and 40 days.

The reference temporal period can also, for example, correspond to the total duration of the measurements of the ambient seismic noise field.

In the coherence computation step 170, the controller 14 calculates a temporal coherence $R_c$ of the samples of the processed signal $S_t$.

To obtain the coherence $R_c$, the controller 14 calculates a matrix R as follows:

$$R = \frac{cov(S_{ref}, AC(t))}{\sqrt{\sigma_{ref}\sigma_{AC(t)}}}$$

with:
cov the covariance,
AC(t) a vector of the autocorrelations computed in computation step 150,
$\sigma_{ref}$ the standard deviation of the reference $S_{ref}$, and
$\sigma_{AC(t)}$ the standard deviation of autocorrelations AC(t).

The coherence $R_c$ is a value located outside the diagonal of the matrix R.

The matrix R is, for example, of dimension 2×2 and symmetrical. The diagonal terms are equal to 1 and the non-diagonal terms of the matrix R correspond to the cross-correlation of the autocorrelation of the considered split window with the reference autocorrelation.

In other words, in this case it is:

$$R_c = |R(2,1)| = |R(1,2)|$$

with R(x,y) the value of the matrix in row x and column y.

During the determination step 180, the controller 14 determines the presence of the fluid. In particular, the controller 14 determines the presence of the fluid using the computed time coherence. Thus the information on the environment 11 is a function of the correlation or autocorrelation of the whitened signals over a given period of time, long enough for the environment 11 to be well sampled by the seismic waves.

In particular, variations in coherence indicate the presence of fluids and variations in the properties of these fluids (for example in terms of composition, migration too).

A second embodiment of the invention is shown in FIG. 2. In what follows, the identical elements of the second embodiment with respect to the first embodiment are not repeated. Only the differences with respect to the first embodiment are highlighted.

According to the second embodiment, the detection system 10 comprises a plurality of sensors. According to the example in FIG. 2, the detection system 10 consists of a first sensor 12A and a second sensor 12B. The first and second sensors 12A and 12B are positioned at a given distance from each other.

The choice of the distance between the sensors 12A, 12B impacts the low value of the frequency range that can be reconstructed from the correlation of the seismic noise field measured by the two sensors 12A, 12B. For example, the low value impacts the maximum investigation depth. Thus, the distance between the sensors 12A and 12B impacts especially the maximum investigation depth in the environment 11.

For surface waves, the investigation depth is related to the wavelength λ divided by 3. This wavelength is related to the velocity c of surface waves in the environment 11 and their frequency f by the relation λ=c/f. The minimum distance to reconstruct a surface wave by noise correlation is, for example, of the order of the target wavelength λ. For example, if c=3000 m/s and f=0.1 Hz then λ=30000 m; the penetration depth is then λ/3=10000 m; the minimum distance between the sensors 12A and 12B is of the order of 30000 m.

Conversely, the maximum distance between the sensors is controlled by the attenuation of the environment 11 (especially the decrease of the amplitude of the wave with the propagation distance).

Each sensor 12A and 12B is identical to the above-mentioned sensor 12.

According to this second embodiment, the system implements a detection method the steps of which are identical to the first embodiment and are not detailed again in what follows. Only the differences from the first embodiment are highlighted.

According to the second embodiment, in the measurement step 110, the first sensor 12A measures a first measured signal S1 and the second sensor 12B measures a second measured signal S2.

In particular, the first sensor 12A is distinct from the second sensor 12B. In particular, the first sensor 12A is time-synchronized with the second sensor 12B.

The filter step 120 is implemented for the first measured signal S1 and the second measured signal S2.

The controller 14 transfers the first measured signal S1 and the second measured signal S2 to obtain a first $S_{trans1}$ frequency signal and a second $S_{trans2}$ frequency signal.

Then the equalization step 125 is implemented for the first frequency signal $S_{trans1}$ and the second frequency signal $S_{trans2}$. to obtain a first equalized signal $S_{eg1}$ and a second equalized signal $S_{eg2}$ and then a first processed signal $S_{t1}$ and a second processed signal $S_{t2}$.

Then, the splitting steps 130 and energy normalization 140, are implemented for the first processed signal $S_{t1}$ and the second processed signal $S_{t2}$.

In the computation step 150, the controller 14 calculates the cross-correlation CC of a sample of the first processed signal $S_{t1}$ with a corresponding sample of the second processed signal $S_{t2}$.

By "corresponding sample", it is understood the sample of the second processed signal $S_{t2}$ which is related in time to the first processed signal $S_{t1}$, most often the processed signals $S_{t1}$, $S_{t2}$ are derived from a measurement in the same time interval.

For example, the cross-correlation CC is computed as follows:

$$CC(p,s)=E[(S_{t1}(p)S_{t1}(s)]$$

with:

$S_{t1}(p)$ the value of the first processed signal $S_{t1}$ at time p, and $S_{t2}$ (s) the value of the second processed signal $S_{t2}$ at time s.

If the first sensor 12A is positioned at a distance from the second sensor 12B, the controller 14 additionally takes into account a propagation delay of the wave in the environment 11 between the first sensor 12A and the second sensor 12B.

In an example, the controller 14 implements a missing data deletion.

The term "missing data deletion" means a deletion of the zero value data added in measurement step 110 in case of missing data in a measurement at one point in time.

The controller 14 then determines the maximum of each cross-correlation CC and sets the maximum time zero.

In the determination step 170, the controller 14 calculates the final correlations. Each final correlation is a cross-correlation of a cross-correlation CC with the reference determined in the reference definition step 160.

Each final correlation presents a maximum value at an instant $t_{max}$. The controller 14 shifts each final correlation in time, in order to obtain final correlations where the maximum, and thus the instant $t_{max}$ is at time zero.

The controller 14 determines the position of the maximum value of each correlation; the correlation undergoes a circular permutation that allows the samples of the correlation to be moved by a number that corresponds to the position of the maximum. In doing so, the maximum is brought back to position 0 on the horizontal time axis in the correlogram. In other words, the circular permutation is likely to create a pseudo-autocorrelogram, for which the maximum is already in zero by construction.

The reference definition step 160, the determination step 170 of a coherence and the determination step 180 of the presence of a fluid are especially implemented for each pair of sensors, especially the torque of the first sensor 12A and the second sensor 12B.

It thus appears that in each embodiment of the detection method, the controller 14 determines the presence of the fluid using the computed temporal coherence.

In particular, the controller 14 uses tables of values to determine the coherence. Each table includes technical data of the measured signal S or S1, S2, corresponding to measurements of the fluid displacements.

The coherence is a comparison of the plurality of correlations with the reference. Each correlation of the plurality of correlations is related to a split time interval. If the coherence is 1, the measured signal and the reference are identical.

The coherence is a measure of the degree of linear dependence of the measured signal with the reference. In particular, coherence allows to detect the presence of a fluid in the environment 11. The coherence is a technical value corresponding to the displacement or change of properties of a fluid in the environment 11.

In particular, the coherence allows to obtain fluid displacement information in the absence of disturbing quantities, such as vibrations from artificial sources.

For example, as a function of the velocity of fluid displacement or the mass or volume of a fluid present in the environment, the coherence is modified.

It appears that the detection method is applicable to signals from the natural environment or to artificially generated signals. By "active signals", we mean signals, and in particular mechanical waves in the environment, which are generated by an actuator. By "passive signals", it is understood a signal generated by a natural source, for example by a movement of a fluid in the environment 11.

It also appears that the wave is, for example, a mechanical wave. By "mechanical wave", it is understood in this description a local disturbance of the environment carrying energy.

In particular, a displacement of a mechanical wave in a geological environment has been considered in the example detailed above. According to this example, the fluid is notably a geological fluid, such as oil, water, natural gas, $CO_2$, $H_2$ or $CH_4$.

According to a variant, the wave is an electromagnetic wave.

An example of application of the detection method is the prediction of seismic shocks or earthquakes. For example, the inventor conducted experiments in the Central Apennines (Italy), an area prone to repeated earthquakes. The method is based on the temporal coherence of the samples. In particular, the method is based on the coherence of seismic noise correlated waveforms (CCW). For example, the L'Aquila earthquake in 2009 and the Amatrice earthquake in 2016 have shown particular seismic noise oscillatory patterns.

In particular, the temporal coherence of the samples corresponds to a spectral bandwidth of the source.

The detection method has a number of advantages.

In particular, observing the coherence of the measured signal S or of the measured signals S1, S2, guarantees an accurate fluid detection. In particular, because of the use of a ballistic part of the measured and correlated signal, i.e. the part comprising a strong amplitude, the sensitivity of the coherence method is very high.

At the same time, the detection system 10 is simpler because only a small number of sensors 12 is involved, to obtain accurate results. Indeed, contrary to the state of the art, in which a plurality of sensors is used, a single sensor 12 is sufficient to reliably detect a fluid according to the detection method. In particular, calculating the coherences $R_c$ allows to obtain additional information from the measurements of the single sensor or a small number of sensors 12, such as two sensors.

In addition, due to the normalization of the measured signal or signals, the determined coherence is comparable between several different detection systems 10 or several different sensors 12. The use of a reference allows, for example, the comparison of correlograms measured by different sensors 12 or at different locations.

The invention claimed is:

1. A method for detecting a fluid, the method comprising at least:
measuring by at least one sensor of a wave propagating in an environment of the wave, in order to obtain at least one measured signal,
splitting the measured signal over a plurality of split time intervals of predefined duration to obtain samples of the measured signal,
computing the temporal coherence of the samples, and
determining the presence of the fluid using the computed temporal coherence.

2. The detection method according to claim 1, wherein, during said splitting, each split time interval has the same duration.

3. The detection method according to claim 1, the detection method also comprising filtering and equalizing of the measured signal in a predefined frequency range.

4. The detection method according to claim 1, the detection method also comprising computing a reference, and wherein the computing of the temporal coherence includes a comparison of a plurality of correlations with the reference, each correlation being related to a split time interval.

5. The detection method according to claim 4, wherein the reference is the average of correlations of samples of the measured signal over a reference time period.

6. The detection method according to claim 5, wherein the reference time period is strictly greater than the maximum of the split time intervals.

7. The detection method according to claim 1, the detection method further comprising normalizing of each sample of the measured signal over the energy of the measured signal.

8. The detection method according to claim 1, wherein, during the measuring, the measured signal is measured by a single sensor.

9. The method for detection according to claim 1, wherein, during the measuring at least one measured signal comprises a first signal measured by a first sensor and a second signal measured by a second sensor, the first sensor being distinct from the second sensor.

10. A system for detecting a fluid, the system comprising-:
at least one sensor configured to measure a wave propagating in an environment of the wave in order to obtain at least one measurement signal,
a controller configured for:
splitting the measured signal over a plurality of split time intervals of predefined duration to obtain samples of the measured signal,
computing the temporal coherence of the samples, and
determining the presence of the fluid using the computed temporal coherence.

11. The system for detecting a fluid according to claim 10, wherein the wave is a mechanical wave.

12. The detection method according to claim 1, wherein the wave is a mechanical wave.

13. The detection method according to claim 2, wherein said duration is of between 5 minutes and 2 hours.

14. The detection method according to the claim 3, wherein said frequency range is comprised between 30 seconds and 2 Hertz.

15. The detection method according to claim 6, wherein the reference time period is comprised between 20 days and 40 days.

16. The detection method according to claim 2, the detection method also comprising filtering and equalizing of the measured signal in a predefined frequency range.

17. The detection method according to claim 2, the detection method also comprising computing a reference, and wherein the computing of the temporal coherence includes a comparison of a plurality of correlations with the reference, each correlation being related to a split time interval.

18. The detection method according to claim 3, the detection method also comprising computing a reference, and wherein the computing of the temporal coherence includes a comparison of a plurality of correlations with the reference, each correlation being related to a split time interval.

19. The detection method according to claim 2, the detection method further comprising normalizing of each sample of the measured signal over the energy of the measured signal.

20. The detection method according to claim 3, the detection method further comprising normalizing of each sample of the measured signal over the energy of the measured signal.

* * * * *